UNITED STATES PATENT OFFICE.

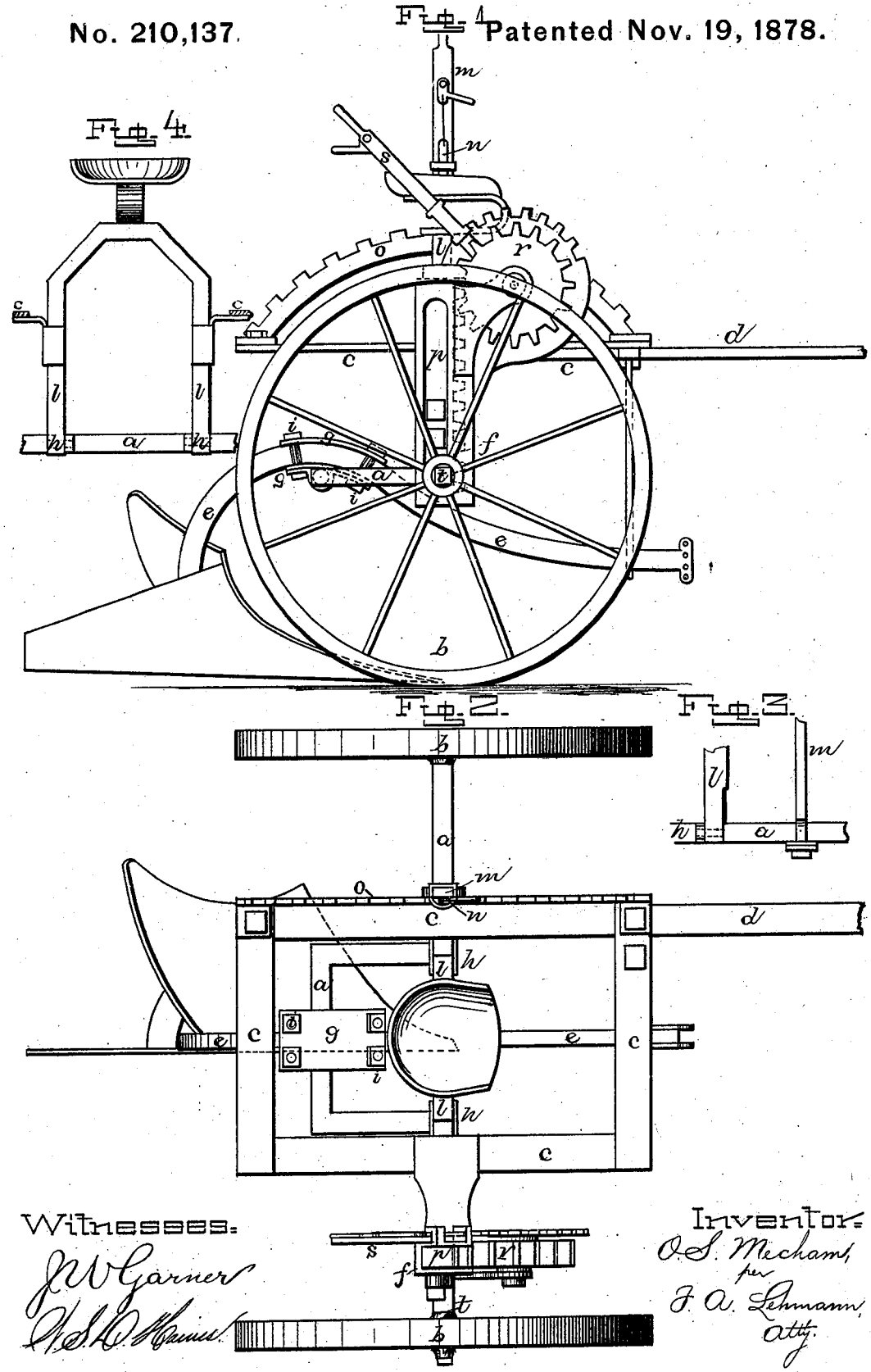

OLIVER S. MECHAM, OF CHAMPAIGN, ILLINOIS.

IMPROVEMENT IN WHEEL-PLOWS.

Specification forming part of Letters Patent No. 210,137, dated November 19, 1878; application filed August 17, 1878.

*To all whom it may concern:*

Be it known that I, OLIVER SAYOR MECHAM, of Champaign, in the county of Champaign and State of Illinois, have invented certain new and useful Improvements in Wheel-Plows; and I do hereby declare the following to be a full, clear, and exact description of the invention, such as will enable others skilled in the art to which it pertains to make and use it, reference being had to the accompanying drawings, which form part of this specification.

The nature of my invention consists in the arrangement, in a wheel-plow, of a rectangular frame, having a seat-frame rigidly secured to the inside thereof, an axle provided with a lever and four bearings, and having the plow-beam pivoted to the central bent portion, a slotted frame secured to the main frame, and having one of the end bearings of the axle in its lower end, a rack-bar, wheel, and lever, all as hereinafter more fully set forth.

In the accompanying drawing, Figure 1 is a side elevation, and Fig. 2 a plan view, of my invention. Figs. 3 and 4 are detailed views of parts thereof.

$a$ represents the axle; $b$, the driving-wheels; $c$, a rectangular frame, having the tongue $d$ secured to one corner. The axle has a bend formed near its center, and at the center of this bend the axle is made round, so as to form a pivot and support for the plow-beam $e$, which beam is connected to the axle by means of the three clamping-plates $g$ and bolts $i$. One of the ends of this axle is journaled in one of the driving-wheels, while the other end is journaled in the lower end of the frame $f$. Inside of the front corners of the bend are formed the two additional journals $h$, which have their bearings in the lower ends of the vertical seat-frame $l$, which is rigidly secured to the inside of the frame $c$.

Thus it will be seen that the axle is provided with four journals or bearings, instead of two, and that it is thereby made more rigid and unyielding, while the frame $c$ is connected thereto in a simpler and cheaper manner.

Rigidly secured to the axle is the hand-lever $m$, which extends up alongside of the driver's seat, and by means of which the axle can be turned partially around, and thereby made to raise and lower the beam $e$ at will.

In order to hold the beam at any desired elevation, the lever is provided with a spring-catch, $n$, which catches in the rack-bar $o$, which is secured to one side of the frame $c$. The frame $f$ is supported in a vertical position by means of the axle at its bottom, and by being secured to the frame $c$ near its upper end.

The frame $f$ moves vertically upon the bar $p$, which has teeth formed upon its front edge, so as to mesh with the teeth of the wheel $r$, journaled in the upper end of the frame $f$. As the journal of this wheel $r$ and the hand-lever $s$ are secured rigidly together, by moving the lever back and forth through a portion of a circle the wheel will rise or descend upon the rack-bar $p'$, and thereby raise and lower that side of the machine with it.

Through the outer side of the frame $f$ is a slot, that extends almost from one side of the frame to the other, and through which the axle $t$ projects. This axle is secured to the lower end of the rack-bar, and has one of the driving-wheels upon it.

As the upper end of the frame $f$ is made curved and formed into a rack, $o'$, and as the lever $s$ is provided with a catch, the height of the adjustable side of the frame can be regulated at will.

By thus making one side of the frame adjustable up and down, one of the wheels can run in the furrow, or the plow can be used on the side of a hill, and always be kept perfectly level.

Having thus described my invention, I claim—

The arrangement, in a wheel-plow, of the rectangular frame $c$, having seat-frame $l$ rigidly secured to the inside thereof, the axle $a$, provided with lever $m$ and four bearings, as described, and having the plow-beam pivoted to the central bent portion thereof, the slotted frame $f$, secured to the frame $c$, and having one of the end bearings of the axle in its lower end, the rack-bar $p$, wheel $r$, and lever $s$, all constructed and arranged to operate as described.

In testimony that I claim the foregoing I have hereunto set my hand this 9th day of August, 1878.

OLIVER SAYOR MECHAM.

Witnesses:
SOLON WHITE,
W. E. FAUGHT.